US012558733B2

(12) United States Patent
Itokazu

(10) Patent No.: US 12,558,733 B2
(45) Date of Patent: Feb. 24, 2026

(54) MULTIWIRE ELECTRIC DISCHARGE MACHINE AND MULTIWIRE ELECTRIC DISCHARGE MACHINING SYSTEM

(71) Applicant: Mitsubishi Electric Corporation, Tokyo (JP)

(72) Inventor: Atsushi Itokazu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 703 days.

(21) Appl. No.: 17/789,536

(22) PCT Filed: Mar. 18, 2020

(86) PCT No.: PCT/JP2020/011977
§ 371 (c)(1),
(2) Date: Jun. 28, 2022

(87) PCT Pub. No.: WO2021/186614
PCT Pub. Date: Sep. 23, 2021

(65) Prior Publication Data
US 2023/0065726 A1     Mar. 2, 2023

(51) Int. Cl.
*B23H 7/20*          (2006.01)
*B23H 7/04*          (2006.01)
(Continued)

(52) U.S. Cl.
CPC ............... *B23H 7/20* (2013.01); *B23H 7/04* (2013.01); *B23H 7/104* (2013.01); *G05B 13/0265* (2013.01); *B23H 2600/10* (2013.01)

(58) Field of Classification Search
CPC . B23H 7/20; B23H 7/04; B23H 7/104; B23H 2600/10; B05B 13/0265; G05B 13/0265
(Continued)

(56) References Cited

U.S. PATENT DOCUMENTS

| | | | |
|---|---|---|---|
| 4,862,095 A | 8/1989 | Yamamoto et al. | |
| 2013/0024020 A1* | 1/2013 | Onodera | .................. B23H 7/20 |
| | | | 700/159 |
| 2016/0318477 A1* | 11/2016 | Morimoto | ............. B60R 25/104 |

FOREIGN PATENT DOCUMENTS

| | | |
|---|---|---|
| JP | 60-255319 A | 12/1985 |
| JP | 2009-184071 A | 8/2009 |

(Continued)

OTHER PUBLICATIONS

Office Action issued Apr. 29, 2024 in Chinese Patent Application No. 202080098442.8, 10 pages.
(Continued)

*Primary Examiner* — Michael P Nghiem
(74) *Attorney, Agent, or Firm* — XSENSUS LLP

(57) ABSTRACT

A multiwire electric discharge machine includes: a machining power source that applies a machining pulse voltage between a workpiece and a cutting wire section; and a wire breakage detection unit that detects breakage of a wire electrode. The wire breakage detection unit is electrically connected in parallel to a wire electrode portion stretched over a section from one location on the feeding side of the wire electrode to one location on the ejection side of the wire electrode, and the wire breakage detection unit includes: a wire breakage detection circuit in which a wire breakage detection power source constantly supplying direct current to the wire electrode portion at least while the workpiece is undergoing a cutting process and a current limiting resistor are connected in series; and a wire breakage determination unit that determines breakage of the wire electrode based on current flowing through the current limiting resistor.

16 Claims, 10 Drawing Sheets

(51) Int. Cl.
    *B23H 7/10*           (2006.01)
    *G05B 13/02*        (2006.01)

(58) Field of Classification Search
    USPC ........................................................ 702/64
    See application file for complete search history.

(56) References Cited

FOREIGN PATENT DOCUMENTS

| | | |
|---|---|---|
| JP | 4948441 B2 | 6/2012 |
| JP | 2012-240128 A | 12/2012 |

OTHER PUBLICATIONS

International Search Report and Written Opinion mailed on Jun. 9, 2020, received for PCT Application PCT/JP2020/011977, filed on Mar. 18, 2020, 8 pages including English Translation.

* cited by examiner

MULTIWIRE
ELECTRIC
DISCHARGE
MACHINE

1

4

6

3a

18

3b

12

13

19

16

20d

17

3d

6a

2

70

15

10

8

3c

6b

5

5

7

11

DRIVE UNIT

14

WIRE
BREAKAGE
DETECTION
UNIT

20b

20

20a

9

Z

Y

X

MACHINING
CONTROL
DEVICE

20

WIRE
BREAKAGE
DETECTION
UNIT

20a

20b

60

OUTPUT WIRE
BREAKAGE SIGNAL

FREQUENCY

THRESHOLD
VALUE

Low

TIME a     b     c

1a MULTIWIRE
ELECTRIC
DISCHARGE
MACHINE

DRIVE UNIT

14

WIRE
BREAKAGE
DETECTION
UNIT

20b

20

MACHINING
CONTROL
DEVICE

9

20a

Z

Y

X

21

22

WIRE BREAKAGE
PREDICTION UNIT

MACHINE
LEARNING
DEVICE

START

ACQUIRE DATA —— b1

PERFORM LEARNING PROCESSING —— b2

STORE LEARNED MODEL —— b3

END

224

LEARNED MODEL STORAGE UNIT

LEARNED MODEL

21

WIRE BREAKAGE PREDICTION UNIT

211

212

STATE DATA

STATE OBSERVATION UNIT

INFERENCE UNIT

PREDICTION INFORMATION

FIG.18

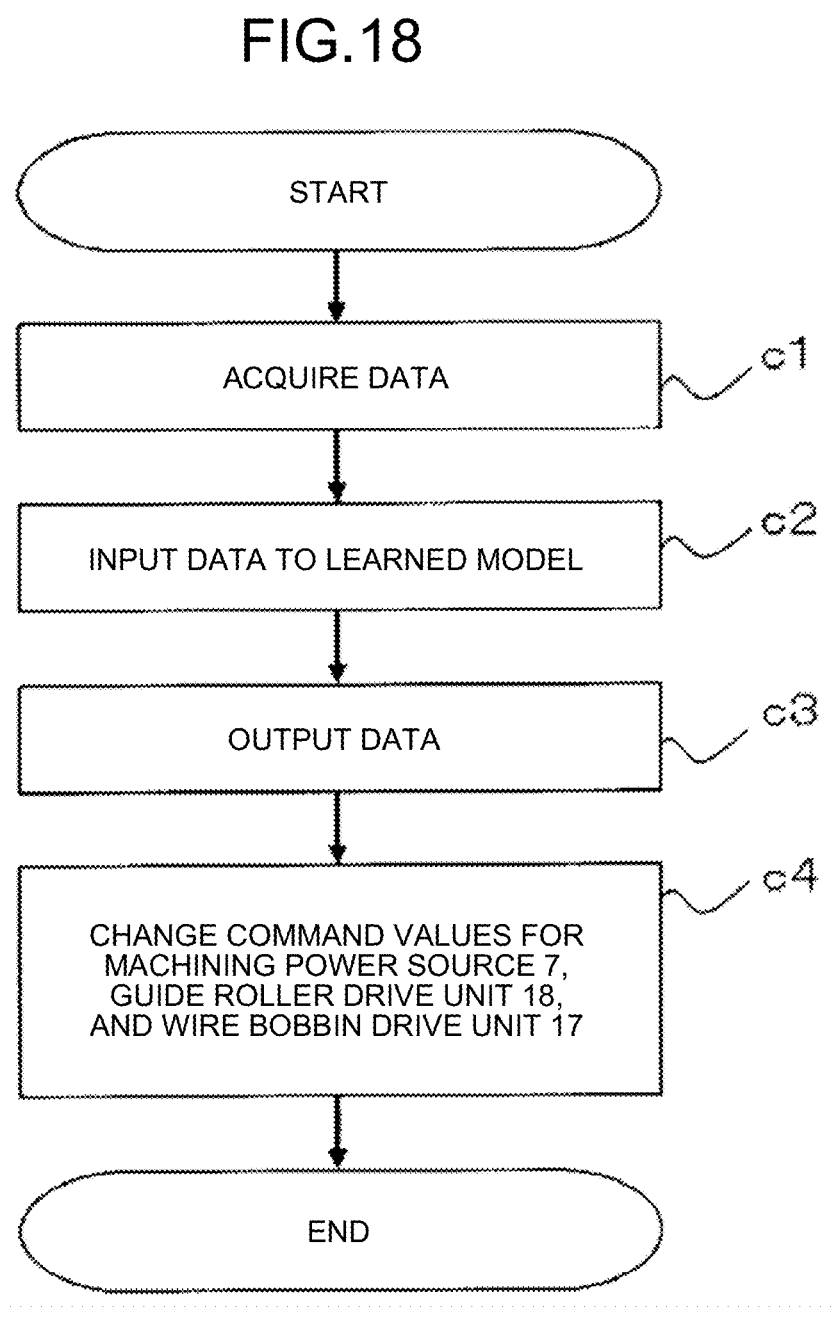

START

ACQUIRE DATA     c1

INPUT DATA TO LEARNED MODEL     c2

OUTPUT DATA     c3

CHANGE COMMAND VALUES FOR
MACHINING POWER SOURCE 7,
GUIDE ROLLER DRIVE UNIT 18,
AND WIRE BOBBIN DRIVE UNIT 17     c4

END

MULTIWIRE ELECTRIC DISCHARGE MACHINE AND MULTIWIRE ELECTRIC DISCHARGE MACHINING SYSTEM

CROSS-REFERENCE TO RELATED APPLICATION

The present application is based on PCT filing PCT/JP2020/011977, filed Mar. 18, 2020, the entire contents of which is incorporated herein by reference.

FIELD

The present disclosure relates to a multiwire electric discharge machine, and more particularly to a multiwire electric discharge machine that includes a cutting wire section including a plurality of wire electrode portions (hereinafter, referred to as cutting wires) arranged in parallel and located in such a way as to face a workpiece, the plurality of cutting wires being stretched in parallel between a plurality of guide rollers by winding a single wire electrode around the plurality of guide rollers, and that cuts the workpiece into a plurality of pieces by applying a pulse voltage to cause an electric discharge between the cutting wire section and the workpiece.

BACKGROUND

As a means for slicing a wafer-like thin plate from a columnar workpiece such as a semiconductor ingot, there has been already disclosed a multiwire electric discharge machining technique in which a cutting wire section including a plurality of cutting wires is formed for a columnar workpiece by use of a single wire electrode wound around a plurality of guide rollers, and a pulse voltage is independently applied to cause an electric discharge between the cutting wire section and the columnar workpiece, so that a plurality of thin plates are collectively cut out from the workpiece (see, for example, Patent Literature 1).

In electric machining such as multiwire electric discharge machining, when breakage (hereinafter, referred to as wire breakage) of a wire electrode occurs, it is important to immediately stop a machining process so as to prevent damage to a workpiece or a machine. Therefore, when wire breakage occurs, it is required that the wire breakage can be quickly and accurately detected. Patent Literature 1 proposes a method for detecting whether a wire electrode is broken, by applying a pulse voltage for breakage detection to a wire electrode only during a period in which no pulse voltage is applied by a machining power source, and by checking the conduction state of the wire electrode.

CITATION LIST

Patent Literature

Patent Literature 1: Japanese Patent Application Laid-open No. 2009-184071

SUMMARY

Technical Problem

A conventional multiwire electric discharge machine is configured such that a single wire electrode is wound around a plurality of guide rollers. Therefore, when the number of turns increases, the inductance of the wire electrode increases, and it becomes difficult to cause a high-frequency current to flow through the wire electrode. Accordingly, the method in which a pulse voltage for breakage detection is applied to a wire electrode and the conduction state of the wire electrode is checked as disclosed in Patent Literature 1 has a problem in that wire breakage cannot be detected when the number of turns of the wire electrode increases.

The present disclosure has been made in view of the above, and an object of the present disclosure is to provide a multiwire electric discharge machine capable of quickly and accurately detecting wire breakage.

Solution to Problem

In order to solve the above-described problem and achieve the object, a multiwire electric discharge machine of the present disclosure includes a cutting wire section including a plurality of cutting wires arranged in parallel and located in such a way as to face a workpiece, the plurality of cutting wires being stretched in parallel between a plurality of guide rollers by winding a single wire electrode around the plurality of guide rollers. The multiwire electric discharge machine cuts the workpiece by causing an electric discharge between the cutting wire section and the workpiece. The multiwire electric discharge machine includes: a machining power source to apply a machining pulse voltage between the workpiece and the cutting wire section; and a wire breakage detection unit to detect breakage of the wire electrode. The wire breakage detection unit is electrically connected in parallel to a wire electrode portion stretched over a section from one location on a feeding side of the wire electrode to one location on an ejection side of the wire electrode, and the wire breakage detection unit includes: a wire breakage detection circuit that is an electric circuit in which a wire breakage detection power source and a current limiting resistor are connected in series, the wire breakage detection power source constantly supplying a direct current to the wire electrode portion at least while the workpiece is undergoing a cutting process; and a wire breakage determination unit to determine breakage of the wire electrode based on a current flowing through the current limiting resistor.

Advantageous Effects of Invention

The multiwire electric discharge machine according to the present disclosure has the effect of enabling wire breakage to be quickly and accurately detected.

BRIEF DESCRIPTION OF DRAWINGS

FIG. 18 is a flowchart related to processing for obtaining prediction information by using the wire breakage prediction unit according to the fifth embodiment.

DESCRIPTION OF EMBODIMENTS

Hereinafter, multiwire electric discharge machines according to embodiments of the present disclosure will be described in detail with reference to the drawings. Note that the present disclosure is not limited to the embodiments.

First Embodiment

Figures 1, 2:
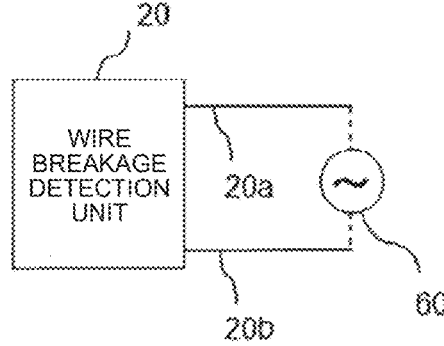
FIG. 1 is a perspective view illustrating a configuration of a main part of a multiwire electric discharge machine according to a first embodiment.
FIG. 2 is a diagram illustrating, as an equivalent circuit, a relationship between a wire breakage detection unit and a wire electrode portion between a connection destination 20a and a connection destination 20b of the wire breakage detection unit during electric discharge machining being performed by the multiwire electric discharge machine according to the first embodiment.

FIG. 1 is a perspective view illustrating a configuration of a main part of a multiwire electric discharge machine in a first embodiment of the present disclosure.

A multiwire electric discharge machine 1 according to the first embodiment includes: a wire bobbin 4, a wire bobbin drive unit 17, wire ejection rollers 5, guide rollers 3a, 3b, 3c, and 3d, a guide roller drive unit 18, a power feeding element 12, a drive unit 14, a machining power source 7, a machining control device 9, a wire breakage detection unit 20, and a machining-state detection device 15. The wire bobbin 4 supplies a wire electrode 6. The wire bobbin drive unit 17 drives the wire bobbin 4. The wire ejection rollers 5 eject the wire electrode 6 from the multiwire electric discharge machine 1. The guide rollers 3a, 3b, 3c, and 3d are for causing the wire electrode 6 to travel appropriately. The guide roller drive unit 18 drives the guide roller 3a. The power feeding element 12 supplies a pulse voltage for machining (hereinafter, referred to as machining pulse voltage) to the wire electrode 6 by coming into contact with the wire electrode 6. The drive unit 14 moves, in a vertical direction, a machining stage 70 on which a workpiece 2 can be placed. The machining power source 7 applies the machining pulse voltage between a cutting wire section 6a and the workpiece 2 via the power feeding element 12. The machining control device 9 controls electric discharge machining. The wire breakage detection unit 20 detects breakage of the wire electrode. The machining-state detection device 15 detects a machining state in the cutting wire section 6a. Note that the multiwire electric discharge machine 1 has an orthogonal coordinate system in which a vertical direction is defined as a Z-axis direction, and two directions orthogonal to each other in a horizontal plane are defined as an X-axis direction and a Y-axis direction.

The four guide rollers 3a to 3d are separated from each other and arranged in parallel in an axial direction such that the positions of their axes form a quadrangular shape in a plane orthogonal to the axial direction. Specifically, the four guide rollers 3a to 3d are provided as follows. The guide rollers 3a and 3b are provided at the highest positions, the guide roller 3c is located below the guide roller 3b, and the guide roller 3d is located below the guide roller 3a, side by side with the guide roller 3c. In addition, a large number of guide grooves for guiding traveling of the wire electrode 6 are formed at intervals in the axial direction on the outer periphery of each of the four guide rollers 3a to 3d.

In the multiwire electric discharge machine 1 described above, the single wire electrode 6 fed from the wire bobbin 4 is guided by the guide grooves of the guide rollers 3a, 3b, 3c, and 3d that rotate clockwise in the illustrated example, and is wound around the four guide rollers 3a, 3b, 3c, and 3d multiple times at intervals corresponding to the intervals between the guide grooves. Then, the wire electrode 6 is ejected from the multiwire electric discharge machine 1 by the wire ejection rollers 5. Here, a portion of the wire electrode 6 stretched in parallel between the guide roller 3c and the guide roller 3d serves as the cutting wire section 6a.

Furthermore, in the illustrated example, the guide roller 3a is driven by the guide roller drive unit 18, and the wire bobbin drive unit 17 drives the wire bobbin 4 such that the tension of the wire electrode 6 is kept constant. In addition, the guide roller drive unit 18 and the wire bobbin drive unit 17 drive the guide roller 3a and the wire bobbin 4, respectively, so as to obtain a desired wire traveling speed.

A position command is output from the machining control device 9 to the drive unit 14 to move the machining stage 70 in the Z-axis direction. As a result, the positional relationship between the workpiece 2 and the cutting wire section 6a is relatively changed. Therefore, the workpiece 2 is moved to approach the cutting wire section 6a according to the position command output from the machining control device 9, and a pulse voltage is applied between the cutting wire section 6a and the workpiece 2 to cause an electric discharge, so that a plurality of thin plates are cut out from the workpiece 2. In addition, the machining control device 9 performs feed control in a cutting direction so as to maintain a gap between the workpiece 2 and the cutting wire section 6a (hereinafter, referred to as electrode gap) at an appropriate electrode gap distance.

Note that an ingot-like workpiece to be sliced into a plurality of thin plates can be used as the workpiece 2. Examples of the material of the workpiece 2 include metals such as tungsten and molybdenum serving as sputtering targets, ceramics such as polycrystalline silicon carbide to be used as various structural members, semiconductor materials such as single crystal silicon, single crystal silicon carbide, single crystal gallium nitride, single crystal gallium oxide, and single crystal diamond serving as semiconductor device wafers, and solar cell materials such as single crystal and polycrystalline silicon serving as solar cell wafers.

Among the above materials, metals can be applied for electric discharge machining with no difficulty. Meanwhile, a semiconductor material and a solar cell material that can be applied for electric discharge machining have a sufficiently low specific resistance of about 100 Ωcm or less, and desirably 10 Ωcm or less. Therefore, a metal or a material with a specific resistance that is equivalent to that of metal or more and 100 Ωcm or less, desirably 10 Ωcm or less is suitable for the workpiece 2. In particular, a semiconductor material and a solar cell material with a specific resistance in the above-described range are suitable for the workpiece 2.

Then, a machining fluid is supplied to the electrode gap between the workpiece 2 and the cutting wire section 6a by spraying or immersion, as in a so-called single-type wire electric discharge machine.

The machining power source 7 generates a machining pulse voltage to be applied to the electrode gap between the workpiece 2 and the cutting wire section 6a on the basis of a machining voltage application command from the machining control device 9. The machining pulse voltage is generated by, for example, a switching power supply system. In addition, the machining power source 7 includes a plurality of machining power supply units 8 that can apply voltage independently of each other. Then, a ground electrode 10 is provided across the plurality of machining power supply units 8 of the machining power source 7. Each ground line of the plurality of machining power supply units 8 is connected to the ground electrode 10, and the ground electrode 10 is connected to the workpiece 2 by a cable 11. Note that the polarity of the machining pulse voltage to be generated can be appropriately inverted as necessary.

The power feeding element 12 includes a plurality of power feeding element units 13 insulated from each other. In the illustrated example, the wire electrode portion stretched in parallel between the guide rollers 3b and 3c serves as a power-supply wire section 6b to which the machining pulse voltage is supplied, and each power feeding element unit 13 is disposed in sliding contact with corresponding one of the wire electrodes of the power-supply wire section 6b in a one-to-one relationship. Then, each power feeding element unit 13 independently feeds a machining pulse voltage generated by corresponding one of the machining power supply units 8 to the corresponding one of the wire electrodes of the power-supply wire section 6b. Therefore, the machining pulse voltage is independently applied to each cutting wire of the cutting wire section 6a from the corresponding one of the machining power supply units 8.

The machining-state detection device 15 is a device that detects a machining state in the cutting wire section 6a. The machining-state detection device 15 is installed on wires 19 connecting the power feeding element 12 and the machining power source 7, and detects a machining state in the cutting wire section 6a by monitoring, via the power feeding element 12, the state of voltage (hereinafter, referred to as electrode gap voltage) applied to the electrode gap between the workpiece 2 and the cutting wire section 6a, the number of times an electric discharge occurs per unit time, the number of times a short circuit occurs per unit time, and a machining pulse voltage that is an output voltage of the machining power source 7. In addition, the machining-state detection device 15 includes a plurality of machining-state detection units 16 such that there is a one-to-one correspondence between the machining-state detection units 16 and the cutting wires of the cutting wire section 6a, and detects the machining state of the cutting wire section 6a for each cutting wire.

A connection destination 20a, which is one of the connection destinations of the wire breakage detection unit 20, is connected, via a power feeding element 20d for wire breakage detection, to the wire electrode 6 between the wire bobbin 4 and the power feeding element unit 13 with which the wire electrode 6 fed from the wire bobbin 4 first comes in sliding contact. Furthermore, a connection destination 20b, which is the other of the connection destinations of the wire breakage detection unit 20, is in sliding contact with the wire ejection roller 5. That is, the wire breakage detection unit 20 is electrically connected in parallel to a wire electrode portion stretched over a section from one location on the feeding side of the wire electrode 6 to one location on the ejection side of the wire electrode 6. Here, the wire ejection roller 5 is made of a conductive material, and the connection destination 20b of the wire breakage detection unit 20 and the ejection side of the wire electrode 6 are electrically connected via the wire ejection roller 5.

Next, a configuration of the wire breakage detection unit 20 and a principle of a method for detecting wire breakage will be described. FIG. 2 is a diagram illustrating, as an equivalent circuit, a relationship between the wire breakage detection unit 20 and a wire electrode portion between the connection destination 20a and the connection destination 20b of the wire breakage detection unit 20 during multiwire electric discharge machining. During multiwire electric discharge machining, an electric discharge stochastically occurs in the electrode gap between the workpiece 2 and the cutting wire section 6a in accordance with the state of the electrode gap (for example, the specific resistance of the machining fluid, the local temperatures of the workpiece 2 and the cutting wire, and the amplitude of the machining pulse voltage). That is, the voltage generated in the wire electrode portion between the connection destination 20a and the connection destination 20b of the wire breakage detection unit 20 (that is, a signal input to the wire breakage detection unit 20) can be regarded as a simulated voltage source 60 that randomly fluctuates according to the machining pulse voltage and the state of electric discharge. That is, a high-frequency voltage that randomly fluctuates according to the machining pulse voltage and the state of electric discharge is generated in the wire electrode portion between the connection destination 20a and the connection destination 20b of the wire breakage detection unit 20. Therefore, the relationship between the wire breakage detection unit 20 and the wire electrode portion between the connection destination 20a and the connection destination 20b of the wire breakage detection unit 20 during multiwire electric discharge machining can be shown by the equivalent circuit in FIG. 2.

Figure 3:
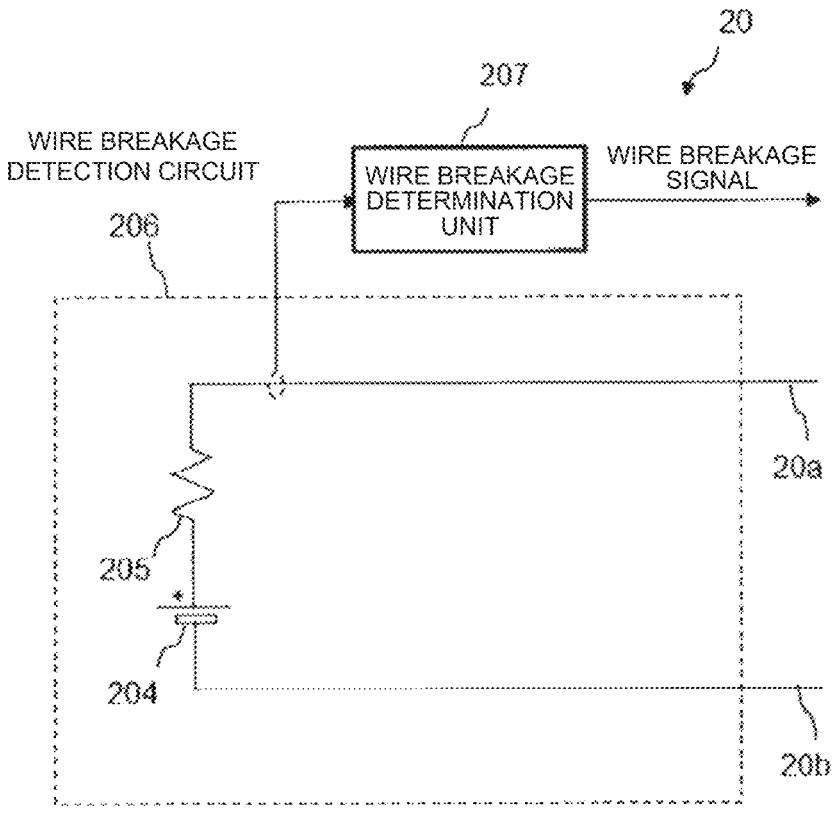
FIG. 3 is a circuit diagram illustrating a configuration of the wire breakage detection unit of the multiwire electric discharge machine according to the first embodiment.

FIG. 3 is a circuit diagram illustrating a configuration of the wire breakage detection unit 20 of the present embodiment. The wire breakage detection unit 20 includes a wire breakage detection circuit 206 that is an electric circuit in which a wire breakage detection power source 204 and a current limiting resistor 205 are connected in series. The wire breakage detection power source 204 supplies a direct current to the wire electrode portion between the connection destination 20a and the connection destination 20b of the wire breakage detection unit 20.

At least while the workpiece 2 is undergoing a cutting process, the wire breakage detection power source 204 constantly applies, as a breakage detection voltage, a DC voltage lower than the machining pulse voltage to be applied by the machining power source 7, and supplies a direct current to the wire electrode portion between the connection destination 20a and the connection destination 20b of the wire breakage detection unit 20. That is, a direct current is constantly supplied to the wire electrode portion between the connection destination 20a and the connection destination 20b of the wire breakage detection unit 20 at least while the workpiece 2 is undergoing a cutting process. Meanwhile, the direct current for wire breakage detection is about several mA to several hundred mA, which is sufficiently smaller than a machining current of about several A to several hundred A, and thus does not affect machining. The current limiting resistor 205 limits current flowing through the wire breakage detection circuit 206. That is, the current limiting resistor 205 limits a direct current that the wire breakage detection power source 204 supplies to the wire electrode portion between the connection destination 20a and the connection destination 20b of the wire breakage detection unit 20, and also limits a current that the simulated voltage source 60 outputs to the wire breakage detection unit 20. In addition, the wire breakage detection unit 20 includes a wire breakage determination unit 207 that determines wire breakage based on current flowing through the current limiting resistor 205. The wire breakage determination unit 207 outputs a wire breakage signal indicating the result of determination on wire breakage to the machining control device 9 to notify the machining control device 9 of a wire breakage detection result.

Next, how the wire breakage detection unit 20 detects wire breakage will be specifically described. In the circuit illustrated in FIG. 3, the current flowing through the current limiting resistor 205 is a current obtained by superimposing a direct current output from the wire breakage detection power source 204 on a high-frequency current output from the simulated voltage source 60. The wire breakage detection power source 204 serves as a DC voltage source; therefore, when the wire electrode 6 is not broken, the wire breakage detection power source 204 causes a direct current to flow through the current limiting resistor 205. In addition, since the simulated voltage source 60 inputs a random voltage signal to the wire breakage detection unit 20, a high-frequency current flows from the simulated voltage source 60 to the current limiting resistor 205.

Therefore, the current to be detected by the wire breakage determination unit 207 is a current obtained by superimposing the direct current output from the wire breakage detection power source 204 on the high-frequency current output from the simulated voltage source 60. Meanwhile, when the wire electrode 6 is broken, the connection destinations 20a and 20b of the wire breakage detection unit 20 are not electrically connected. Therefore, no current flows through the current limiting resistor 205. At this time, in a case where a state in which current has stopped flowing through the current limiting resistor 205 can be detected, the wire breakage determination unit 207 determines that wire breakage has occurred. In this manner, it is possible to detect wire breakage by sequentially monitoring the current flowing through the current limiting resistor 205.

Note that the wire electrode 6 connecting the connection destinations 20a and 20b of the wire breakage detection unit 20, with a sufficient length, may be used instead of the current limiting resistor 205, and the circuit configuration of the current limiting resistor 205 is not limited as long as it is possible to detect wire breakage by sequentially monitoring the current flowing through the current limiting resistor 205.

Figure 4:
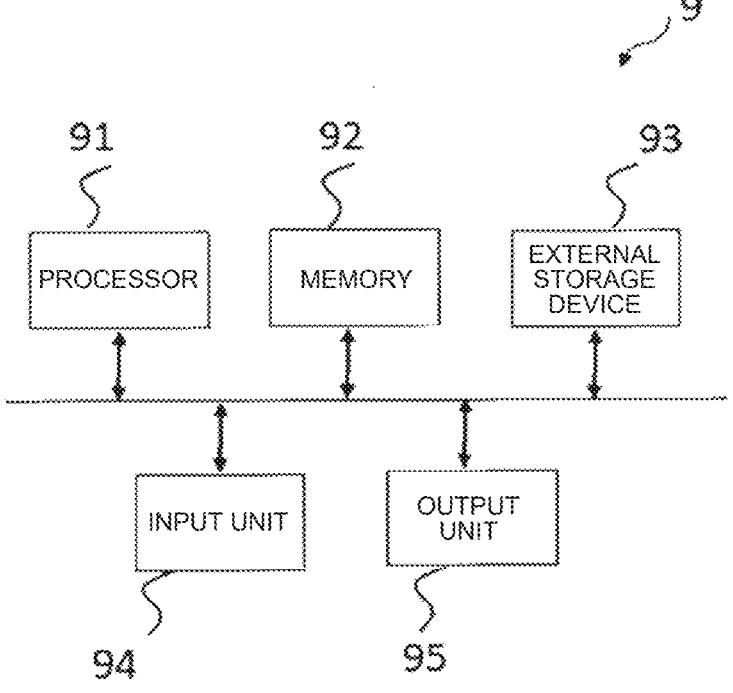
FIG. 4 is a block diagram illustrating a hardware configuration of a machining control device according to the first embodiment.

Next, a description will be given of a hardware configuration of the machining control device 9 included in the multiwire electric discharge machine 1 according to the first embodiment. Each function of the machining control device 9 is implemented by use of a computer system such as a personal computer or a general-purpose computer. FIG. 4 is a diagram showing an example of a hardware configuration of the machining control device 9 in a case where the functions of the machining control device 9 according to the first embodiment are implemented by use of a computer system.

The machining control device 9 includes a processor 91, a memory 92, an external storage device 93, an input unit 94, and an output unit 95. The processor 91 executes various types of processing. The memory 92 is a built-in memory. The external storage device 93 stores various types of information. The input unit 94 acquires information input by an operator. The output unit 95 presents various types of information to the operator.

The processor 91 is a central processing unit (CPU). The processor 91 may be a processing device, an arithmetic device, a microprocessor, a microcomputer, or a digital signal processor (DSP). Each function of the machining control device 9 is implemented by the processor 91, and software, firmware, or a combination of software and firmware. The software or firmware is described as a program, and stored in the external storage device 93. The processor 91 reads software or firmware stored in the external storage device 93 into the memory 92, and executes the software or firmware.

The memory 92 is a nonvolatile or volatile semiconductor memory. Examples of the memory 92 include a random access memory (RAM), a read only memory (ROM), a flash memory, an erasable programmable read only memory (EPROM), and an electrically erasable programmable read only memory (EEPROM) (registered trademark). The external storage device 93 is a hard disk drive (HDD) or a solid state drive (SSD).

The input unit 94 includes an input device represented by an input key and a pointing device. The input unit 94 acquires information input by an operator of the multiwire electric discharge machine 1, and notifies the processor 91 of the acquired information. The output unit 95 includes an output device represented by a liquid crystal display (LCD) and a speaker. The output unit 95 forms a touch screen integrally formed with a pointing device included in the input unit 94. The output unit 95 presents various types of information to the operator in accordance with an instruction from the processor 91.

As described above, with such a configuration, the multiwire electric discharge machine 1 according to the present embodiment constantly applies the DC voltage output from the wire breakage detection power source 204 to the wire electrode 6 at least while the workpiece 2 is undergoing a cutting process, and checks the conduction state of the wire electrode 6. As a result, the multiwire electric discharge machine 1 according to the present embodiment can accurately detect wire breakage without being affected by inductance generated by the winding of the single wire electrode 6 around the plurality of guide rollers. Furthermore, it is possible to quickly detect wire breakage by applying the DC voltage output from the wire breakage detection power source 204 to the wire electrode 6 and checking the conduction state of the wire based on the current obtained by superimposing the high-frequency current input from the wire electrode 6 to the wire breakage detection unit 20 on the direct current supplied from the wire breakage detection power source 204, not only during a period in which no machining pulse voltage is applied by the machining power source 7, but also during multiwire electric discharge machining.

Second Embodiment

Figure 5:
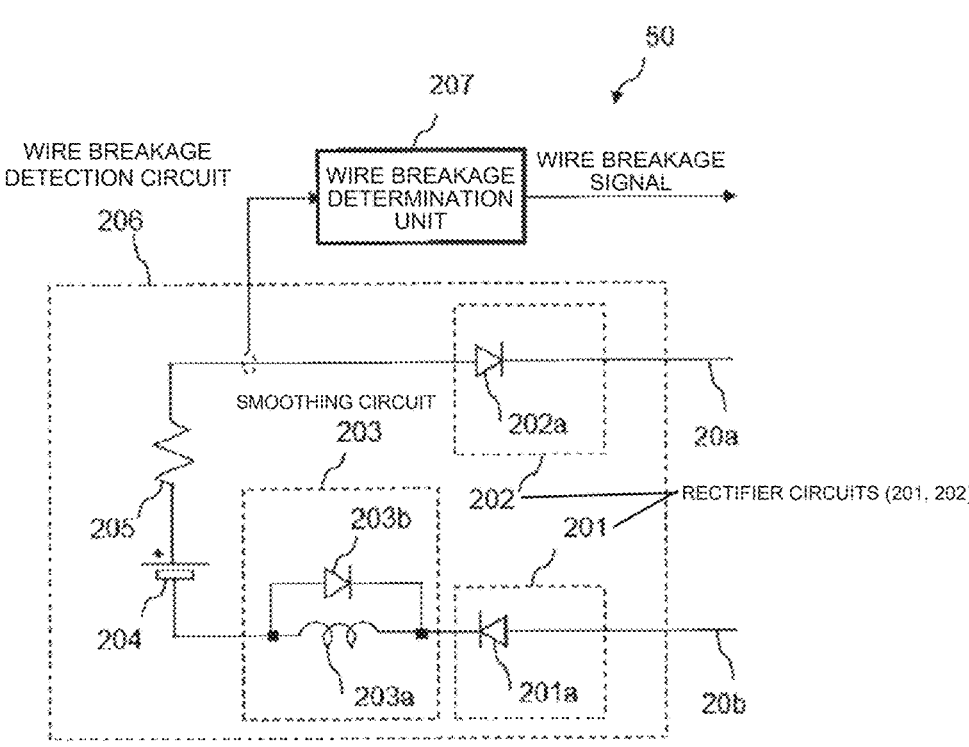
FIG. 5 is a circuit diagram illustrating a configuration of a wire breakage detection unit of a multiwire electric discharge machine according to a second embodiment.

In the first embodiment, the configuration of the wire breakage detection unit 20 has been described as illustrated in FIG. 3. Meanwhile, the configuration of the wire breakage detection unit 50 according to the second embodiment may be as illustrated in FIG. 5. The configuration of FIG. 5 is the same as the configuration of FIG. 3 except that rectifier circuits 201 and 202 and a smoothing circuit 203 have been added to the configuration of FIG. 3. The rectifier circuits 201 and 202 rectify high-frequency voltage generated in the wire electrode portion between the connection destination 20a and the connection destination 20b of the wire breakage detection unit 50 according to the machining pulse voltage and the state of electric discharge. The smoothing circuit 203 smooths current rectified by the rectifier circuits 201 and 202. The rectifier circuits 201 and 202 only need to be capable of rectifying high-frequency voltage, and include, for example, rectifier diodes 201a and 202a. The smoothing circuit 203 only needs to be capable of smoothing the current rectified by the rectifier circuits 201 and 202, and includes, for example, a circuit in which a high-frequency cutoff inductor 203a and a damper diode 203b are connected in parallel. With such a configuration, a high-frequency current output from the simulated voltage source 60 is smoothed and superimposed on a direct current output from the wire breakage detection power source 204, and the current thus obtained flows through the current limiting resistor 205. The wire breakage determination unit 207 detects this current, and checks the conduction state of the wire by the same method as in the first embodiment. As a result, wire breakage can be detected.

Third Embodiment

In a case where the conduction state of the wire electrode 6 is checked by use of current flowing through the current limiting resistor 205, the current flowing through the current limiting resistor 205 oscillates immediately after occurrence of wire breakage. Therefore, in order to accurately detect wire breakage, it has been necessary to wait until the current becomes stable before performing detection. In a third embodiment, a method for quickly detecting wire breakage will be described. The same parts as those in the first embodiment will not be described, and parts different from those in the first embodiment will be described.

Figure 6:
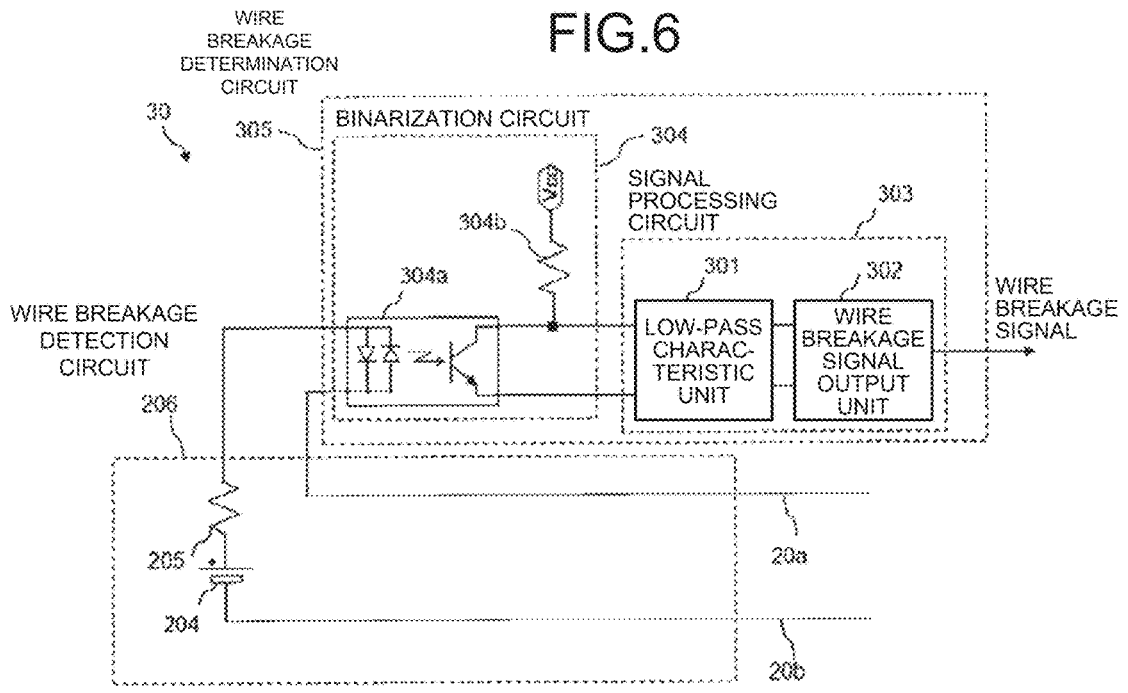
FIG. 6 is a circuit diagram illustrating a configuration of a wire breakage detection unit of a multiwire electric discharge machine according to a third embodiment.

FIG. 6 is a circuit diagram illustrating a configuration of a wire breakage detection unit 30 of a multiwire electric discharge machine according to the third embodiment. A wire breakage determination unit 305 includes a binarization circuit 304 and a signal processing circuit 303. The binarization circuit 304 converts current flowing through the current limiting resistor 205 into a binarized signal that is a low-level signal or a high-level signal according to whether current is flowing through the current limiting resistor 205. The signal processing circuit 303 outputs a wire breakage signal based on the binarized signal. As an example, it is possible to configure the binarization circuit 304 by combining a photocoupler 304a and a pull-up resistor 304b, as illustrated in FIG. 6, such that the binarization circuit 304 converts current flowing through the current limiting resistor 205 into a binarized signal by outputting a low-level analog signal when current flows through the current limiting resistor 205 and outputting a high-level analog signal when no current flows through the current limiting resistor 205.

The signal processing circuit 303 outputs a wire breakage signal based on a result of detecting whether the signal output from the binarization circuit 304 is a high-level signal or a low-level signal. In this manner, it is possible to detect wire breakage by monitoring the wire breakage signal. In the multiwire electric discharge machine according to the third embodiment, the signal processing circuit 303 includes a low-pass characteristic unit 301 and a wire breakage signal output unit 302 so as to detect whether the analog signal output from the binarization circuit 304 is a high-level signal or a low-level signal. The low-pass characteristic unit 301 is a circuit having a low-pass characteristic. The wire breakage signal output unit 302 outputs a wire breakage signal based on a signal output from the low-pass characteristic unit 301. Examples of the configuration of the low-pass characteristic unit 301 include a CR type low-pass filter, an active low-pass filter using an operational amplifier, a digital filter using a D flip-flop, and a finite impulse response (FIR) filter. However, the circuit configuration of the low-pass characteristic unit 301 is not limited to such circuit configurations as long as the low-pass characteristic unit 301 is a circuit having a low-pass characteristic.

Figure 7:
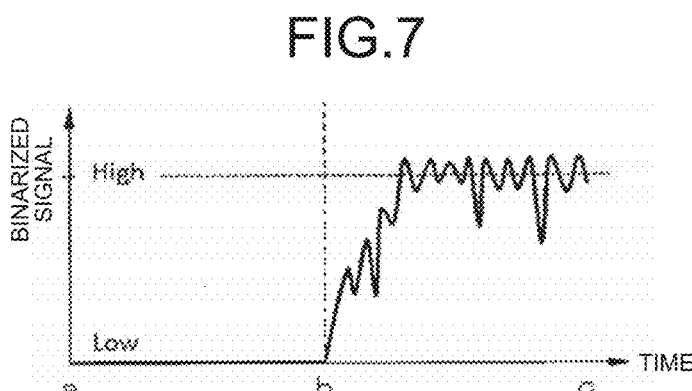
FIG. 7 is a diagram describing response of a binarization circuit according to the third embodiment, before and after wire breakage.
Figure 8:
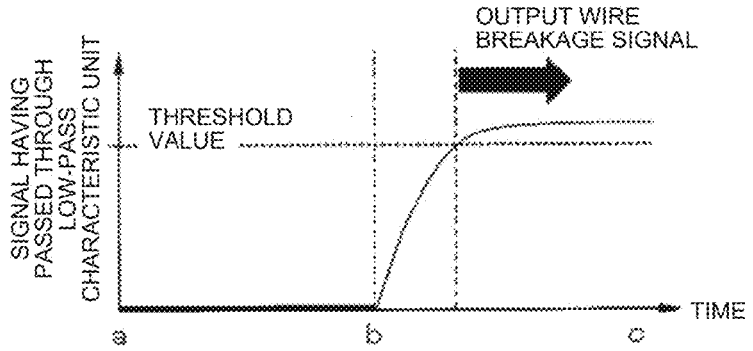
FIG. 8 is a diagram describing response of a low-pass characteristic unit according to the third embodiment, before and after wire breakage.

FIG. 7 is a diagram describing response of the binarization circuit 304 before and after wire breakage. Before wire breakage (between time "a" and time "b"), the connection destinations 20a and 20b of the wire breakage detection unit 30 are put in a conduction state by the wire electrode 6, and current flows through the current limiting resistor 205, so that the output of the binarization circuit 304 indicates a low level. Although the output current of the wire breakage detection power source 204 becomes zero immediately after occurrence of the wire breakage (between time "b" and time "c"), the output current of the simulated voltage source 60 transiently flows into the wire breakage detection unit 30 before converging to zero, so that a binarized signal oscillates and reaches the high level. FIG. 8 is a diagram describing response of the low-pass characteristic unit 301 before and after wire breakage. When a binarized signal that oscillates is input to the low-pass characteristic unit 301, an oscillating component is removed by a low-pass filter, and a signal waveform as illustrated in FIG. 8 is obtained. When a signal having passed through the low-pass characteristic unit 301 reaches or exceeds a preset threshold value, the wire breakage signal output unit 302 determines that wire breakage has occurred, and outputs a wire breakage signal. That is, the signal processing circuit 303 outputs a wire breakage signal on the basis of a result of comparison between the predetermined threshold value and a signal that is a binarized signal having passed through the low-pass filter.

As described above, according to the present embodiment, the wire breakage determination unit 305 includes the binarization circuit 304 and the signal processing circuit 303. The binarization circuit 304 converts current flowing through the current limiting resistor 205 into a binarized signal that is a low-level signal or a high-level signal according to whether current is flowing through the current limiting resistor 205. The signal processing circuit 303 has a low-pass characteristic. As a result, it is possible to quickly detect wire breakage even if the current flowing through the current limiting resistor 205 being monitored so as to check a conduction state oscillates immediately after occurrence of wire breakage.

Fourth Embodiment

Described in the third embodiment is a method for quickly detecting wire breakage even if current flowing through the current limiting resistor 205 oscillates immediately after occurrence of wire breakage, by using the wire breakage determination unit 305 configured to include the binarization circuit 304 and the signal processing circuit 303 having a low-pass characteristic. Meanwhile, a method for quickly detecting wire breakage even with a configuration in which the signal processing circuit has no low-pass characteristic will be described in a fourth embodiment. The same parts as those in the third embodiment will not be described, and parts different from those in the third embodiment will be described.

Figure 9:
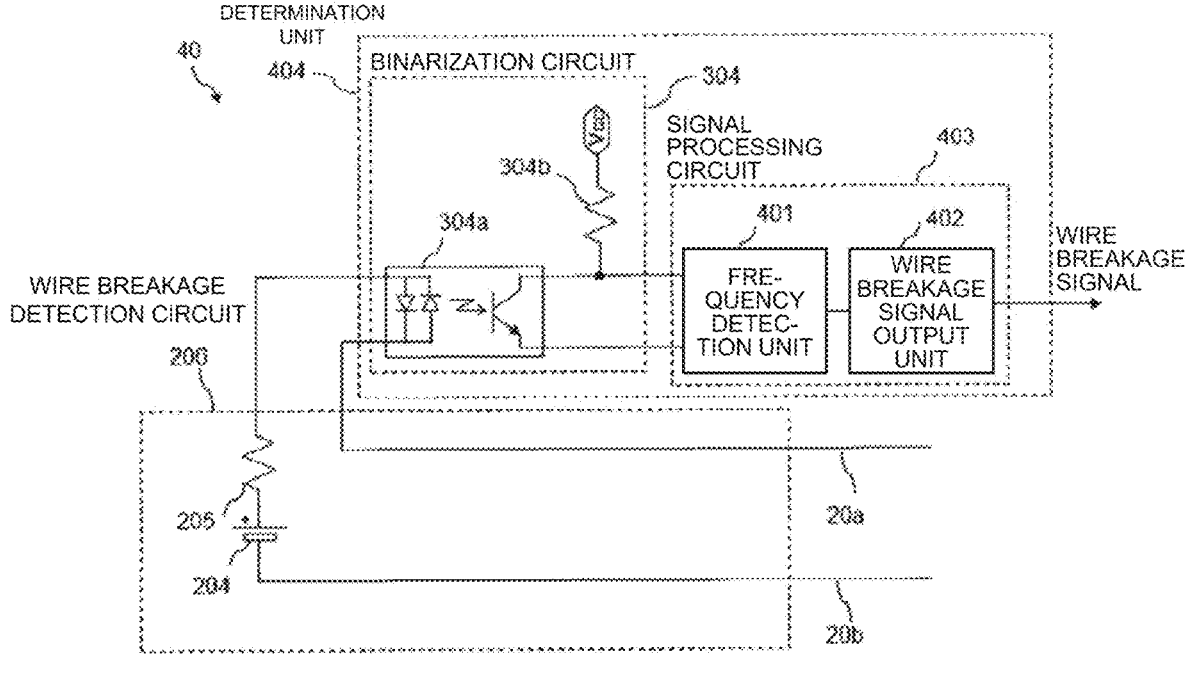
FIG. 9 is a circuit diagram illustrating a configuration of a wire breakage detection unit of a multiwire electric discharge machine according to a fourth embodiment.
Figures 10, 11:
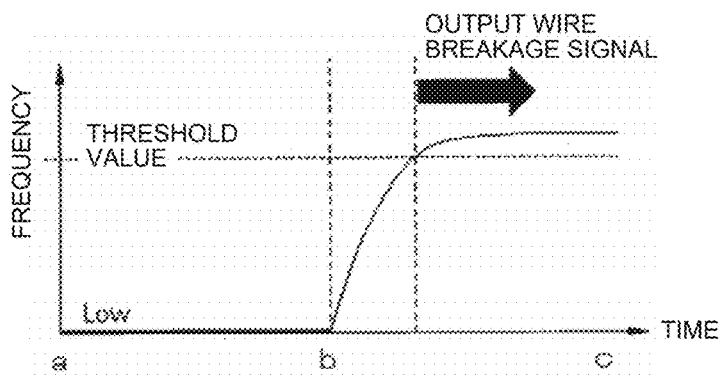
FIG. 10 is a diagram describing response of a frequency detection unit according to the fourth embodiment, before and after wire breakage.
FIG. 11 is a perspective view illustrating a configuration of a main part of a multiwire electric discharge machine according to a fifth embodiment.

FIG. 9 is a circuit diagram illustrating a configuration of a wire breakage detection unit 40 of a multiwire electric discharge machine according to the fourth embodiment. The multiwire electric discharge machine according to the fourth embodiment has the same configuration as the multiwire electric discharge machine according to the third embodiment except that the multiwire electric discharge machine according to the fourth embodiment includes a signal processing circuit 403 that is different from the signal processing circuit in the third embodiment. The signal processing circuit 403 includes a frequency detection unit 401 and a wire breakage signal output unit 402. The frequency detection unit 401 detects the frequency of a signal output from the binarization circuit 304. The wire breakage signal output unit 402 outputs a wire breakage signal based on the detected frequency. As described above, a binarized signal immediately after occurrence of wire breakage has a waveform in which oscillation is repeated periodically as illustrated in FIG. 7. FIG. 10 is a diagram describing response of the frequency detection unit 401 before and after wire breakage. When a binarized signal that periodically repeats oscillation is input to the frequency detection unit 401, the frequency detection unit 401 detects the frequency of the binarized signal, and outputs a detection result as illustrated in FIG. 10 to the wire breakage signal output unit 402. If the detected frequency is higher than a predetermined threshold value (for example, several tens of Hz to several kHz), the wire breakage signal output unit 402 determines that wire breakage has occurred, and outputs a wire breakage signal. That is, the signal processing circuit 403 detects the frequency of a binarized signal, and outputs a wire breakage signal based on a result of comparison with the predetermined threshold value.

As described above, according to the present embodiment, wire breakage is determined based on detection of the frequency of a binarized signal, so that it is possible to quickly detect wire breakage even if current flowing through the current limiting resistor 205 being monitored so as to check a conduction state oscillates immediately after occurrence of wire breakage.

Fifth Embodiment

A method for detecting wire breakage when the wire breakage occurs has been described in the first to fourth embodiments. Meanwhile, a method for predicting wire breakage in advance and preventing the wire breakage by using a result of learning performed by a machine learning device will be described in a fifth embodiment. The same parts as those in the first to fourth embodiments will not be described, and parts different from those in the first to fourth embodiments will be described.

FIG. 11 is a perspective view illustrating a configuration of a main part of a multiwire electric discharge machine 1*a* according to the fifth embodiment. The multiwire electric discharge machine 1*a* is configured such that a wire breakage prediction unit 21 and a machine learning device 22 have been added to the configuration of the main part of the multiwire electric discharge machine 1 in the first embodiment.

Next, operation of the wire breakage prediction unit 21 and the machine learning device 22 will be described separately for a learning phase and a utilization phase.
<Learning Phase>

Figure 12:
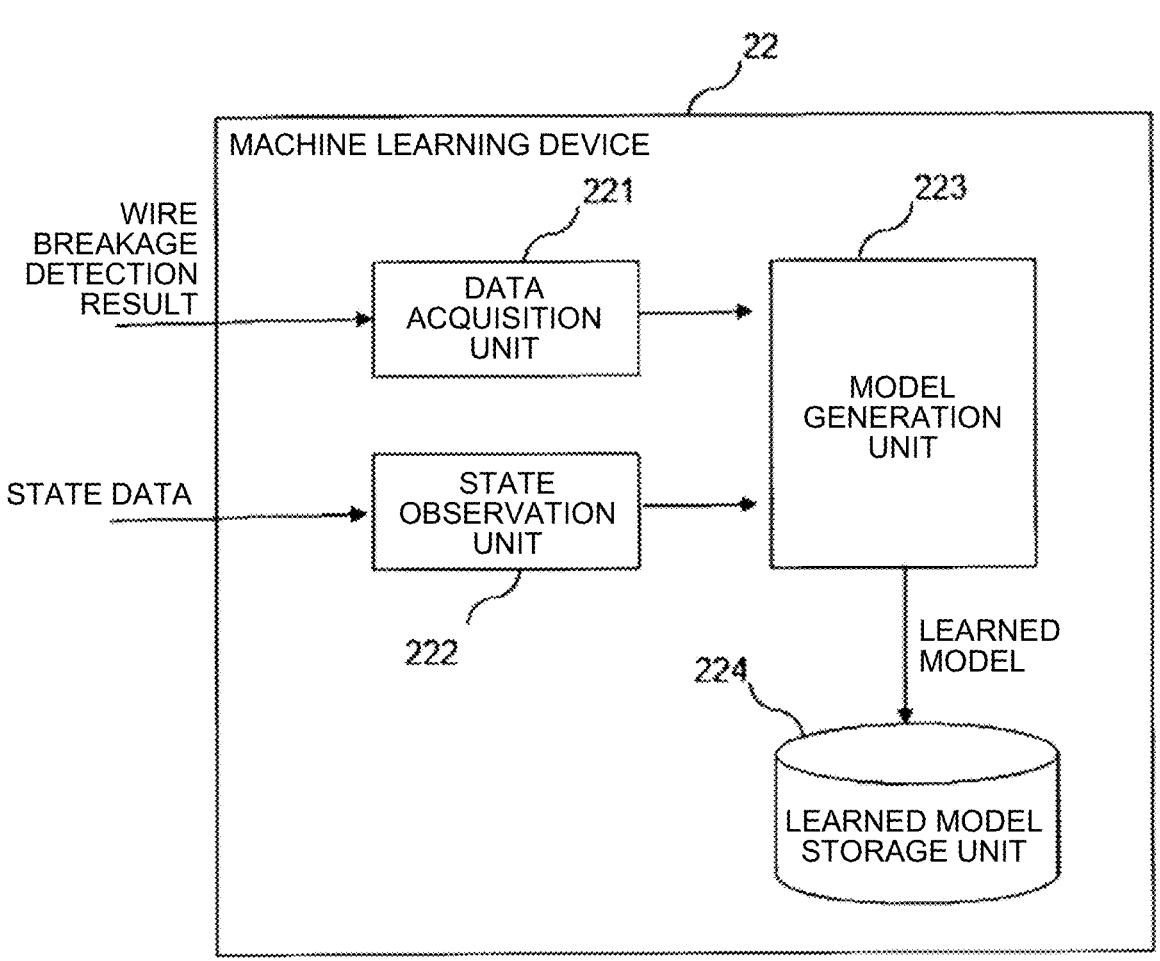
FIG. 12 is a diagram illustrating a configuration of a machine learning device according to the fifth embodiment.

FIG. 12 is a diagram illustrating a configuration of the machine learning device 22 according to the fifth embodiment. The machine learning device 22 includes a data acquisition unit 221, a state observation unit 222, a model generation unit 223, and a learned model storage unit 224.

The data acquisition unit 221 acquires, via the machining control device 9, a wire breakage detection result output by the wire breakage detection unit 20. The state observation unit 222 acquires, via the machining control device 9, state data as information indicating a machining state in machining. Examples of the state data include the relative distance between the workpiece 2 and the cutting wire section 6*a*, wire traveling speed, wire tension, and a plurality of results output by the machining-state detection device 15.

The model generation unit 223 learns information (hereinafter, referred to as prediction information) indicating the possibility that the wire electrode 6 will be broken, according to training data created based on combinations of wire breakage detection results output from the data acquisition unit 221 and state data output from the state observation unit 222. That is, a learned model is generated which infers optimum prediction information from wire breakage detection results and state data. Here, the training data are data in which wire breakage detection results and state data are associated with each other.

Figure 16:
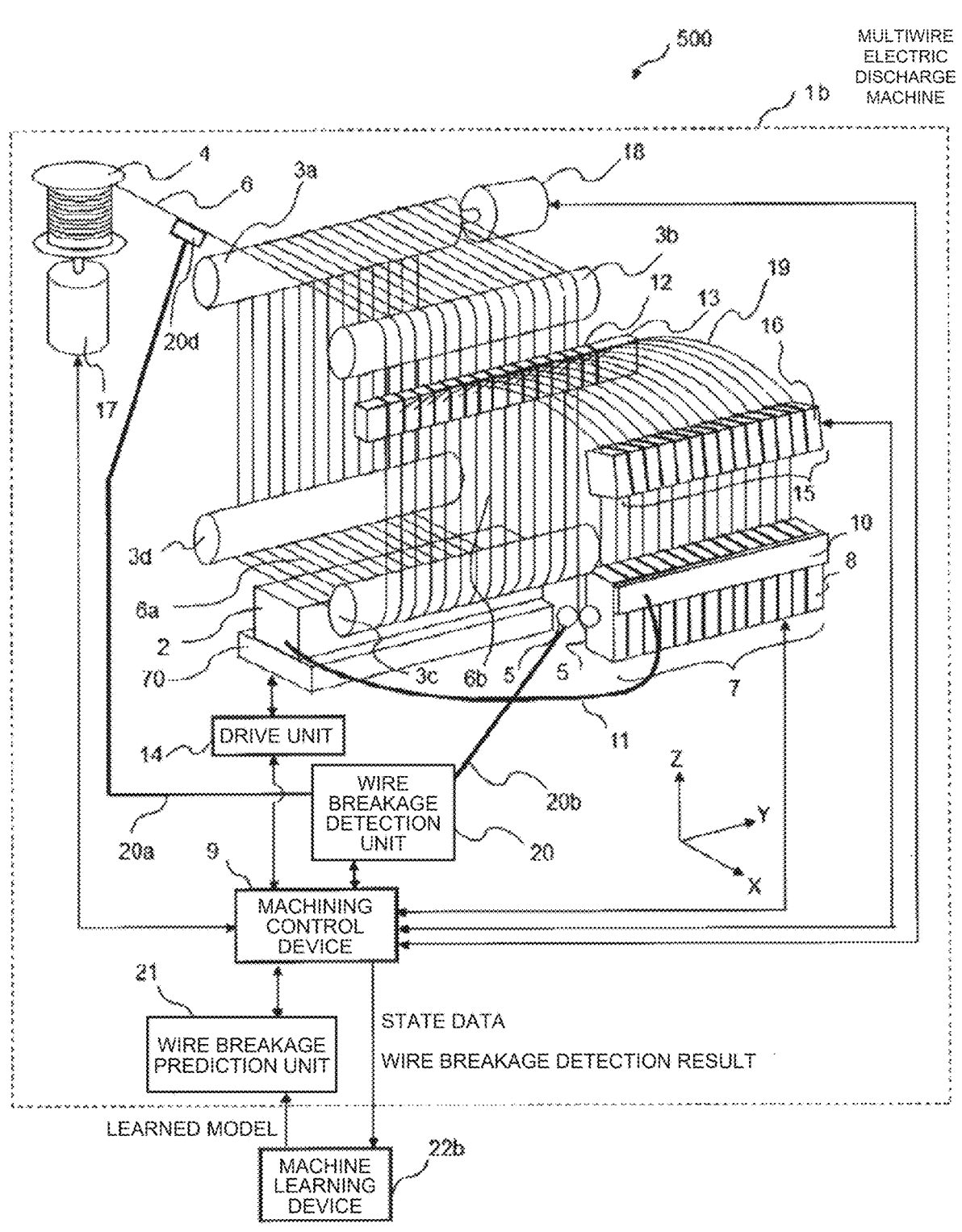
FIG. 16 is a diagram illustrating a configuration of a multiwire electric discharge machining system according to the fifth embodiment.

Note that the machine learning device 22 is used to learn prediction information, but may be, for example, a device provided separately from the multiwire electric discharge machine and connected to the multiwire electric discharge machine via a network. In addition, the machine learning device 22 may be built into the multiwire electric discharge machine. Moreover, the machine learning device 22 may be located on a cloud server. FIG. 16 is a diagram illustrating a configuration of a multiwire electric discharge machining system 500 including a multiwire electric discharge machine 1*b* and a machine learning device 22*b*. The present multiwire electric discharge machining system 500 has a configuration different from the configuration of FIG. 11 in that the machine learning device 22*b* is provided outside the multiwire electric discharge machine 1*b*. The machine learning device 22*b* acquires wire breakage detection results and state data from the multiwire electric discharge machine 1*b* as training data, and generates a learned model by machine learning. The wire breakage prediction unit 21 included in the multiwire electric discharge machine 1*b* acquires the learned model from the machine learning device 22*b*, and outputs prediction information by using the learned model.

Returning to FIG. 12, a known algorithm of supervised learning can be used as a learning algorithm by the model generation unit 223. As an example, a case where a neural network is applied will be described. For example, the model generation unit 223 learns prediction information by so-called supervised learning according to a neural network model. Here, the supervised learning refers to a technique of giving data sets of inputs and results (labels) to a learning device to learn features in these training data and inferring a result from an input.

The neural network includes an input layer including a plurality of neurons, an intermediate layer (hidden layer) including a plurality of neurons, and an output layer including a plurality of neurons. The neural network may include a single intermediate layer, or may include two or more intermediate layers.

Figure 13:
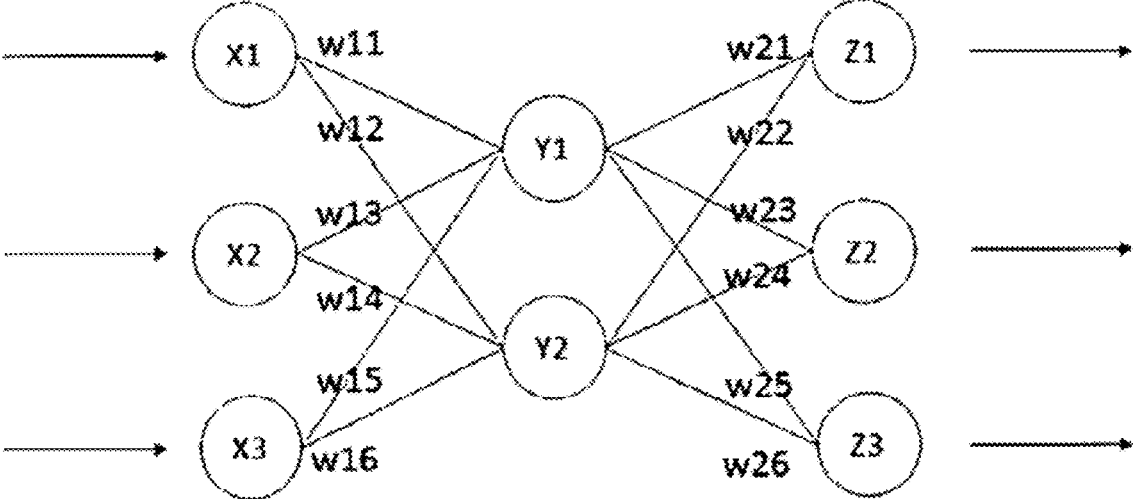
FIG. 13 is a diagram showing an example of a three-layer neural network according to the fifth embodiment.

For example, in the case of a three-layer neural network as illustrated in FIG. 13, when a plurality of inputs are provided to an input layer (X1-X3), the values are multiplied by weights W1 (w11-w16) and input to an intermediate layer (Y1-Y2), and the results are further multiplied by weights W2 (w21-w26) and output from an output layer (Z1-Z3). The output results vary depending on the values of the weights W1 and W2.

In the present application, the neural network learns prediction information by using so-called supervised learning according to training data created based on combinations of wire breakage detection results acquired by the data acquisition unit 221 and state data acquired from the state observation unit 222.

That is, the neural network performs learning by adjusting the weights W1 and W2 such that a result output from the output layer in response to the input of state data to the input layer approaches a wire breakage detection result.

The model generation unit 223 generates and outputs a learned model by performing learning as described above.

The learned model storage unit 224 stores the learned model output from the model generation unit 223.

Figure 14:
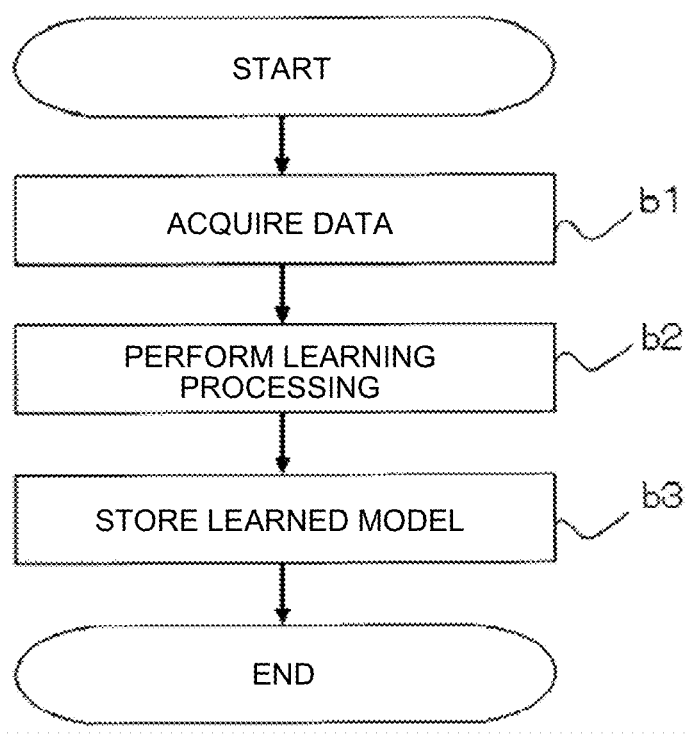
FIG. 14 is a flowchart related to learning processing to be performed by the machine learning device according to the fifth embodiment.

Next, learning processing to be performed by the machine learning device 22 will be described with reference to FIG. 14. FIG. 14 is a flowchart related to learning processing to be performed by the machine learning device 22.

In step b1, the data acquisition unit 221 acquires a wire breakage detection result, and the state observation unit 222 acquires state data. Note that although the wire breakage detection result and the state data are assumed to be simultaneously acquired, the wire breakage detection result and the state data may be acquired at different timings as long as the wire breakage detection result and the state data can be input in association with each other.

In step b2, the model generation unit 223 generates a learned model by learning prediction information by so-called supervised learning according to training data created based on combinations of wire breakage detection results acquired by the data acquisition unit 221 and state data acquired by the state observation unit 222.

In step b3, the learned model storage unit 224 stores the learned model generated by the model generation unit 223.

<Utilization Phase>

Figure 15:
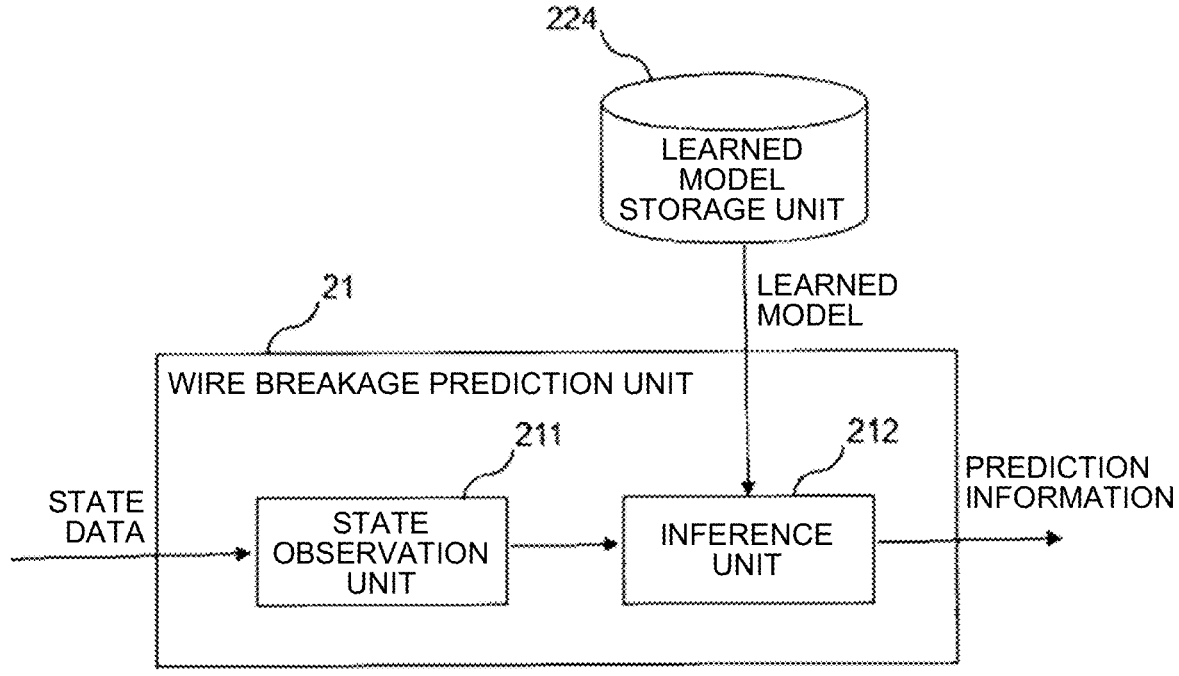
FIG. 15 is a configuration diagram of a wire breakage prediction unit related to the multiwire electric discharge machine according to the fifth embodiment.

FIG. 15 is a configuration diagram of the wire breakage prediction unit 21 related to the multiwire electric discharge machine. The wire breakage prediction unit 21 includes a state observation unit 211 and an inference unit 212.

The state observation unit 211 acquires state data.

The inference unit 212 infers prediction information to be obtained by use of a learned model. That is, as a result of inputting the state data acquired by the state observation unit 211 to the learned model, it is possible to output prediction information inferred from the state data.

Note that it has been described in the present embodiment that prediction information is output by use of a learned model obtained as a result of learning performed by the model generation unit 223 of the multiwire electric discharge machine 1a, but a learned model may be acquired from an external device such as another multiwire electric discharge machine, and prediction information may be output based on the learned model.

Next, processing for obtaining prediction information by using the wire breakage prediction unit 21 will be described with reference to FIG. 18.

In step c1, the state observation unit 211 acquires state data.

In step c2, the wire breakage prediction unit 21 inputs the state data to a learned model stored in the learned model storage unit 224 to obtain prediction information.

In step c3, the inference unit 212 outputs the prediction information obtained by means of the learned model to the machining control device 9.

In step c4, the machining control device 9 controls electric discharge machining so as to prevent breakage of the wire electrode by using the output prediction information. When the prediction information indicates that there is a possibility of wire breakage, the machining control device 9 instructs the machining power source 7 to lower machining energy. That is, the machining control device 9 controls the machining power source 7 in such a way as to make machining energy lower than the current machining energy. In addition, the machining control device 9 may output a command to lower wire tension or a command to increase wire traveling speed to the guide roller drive unit 18 and the wire bobbin drive unit 17. That is, the machining control device 9 controls the guide roller drive unit and the wire bobbin drive unit in such a way as to make wire tension smaller than the current wire tension or make wire traveling speed greater than the current wire traveling speed. Thus, wire breakage in multiwire electric discharge machining can be prevented, and the workpiece 2 can be stably machined.

Note that, the case where supervised learning is applied as a learning algorithm to be used by the model generation unit 223 has been described in the present embodiment, but the learning algorithm is not limited thereto. As the learning algorithm, semi-supervised learning or the like can also be applied in addition to supervised learning.

Furthermore, the model generation unit 223 may learn prediction information according to training data created for a plurality of multiwire electric discharge machines. Note that the model generation unit 223 may acquire training data from a plurality of multiwire electric discharge machines used in the same area, or may learn prediction information by using training data collected from a plurality of multiwire electric discharge machines operating independently in different areas. In addition, a multiwire electric discharge machine from which training data are collected can be added to or removed from the plurality of multiwire electric discharge machines in the course of a learning process. Furthermore, a machine learning device that has learned prediction information for a certain multiwire electric discharge machine may be applied to another multiwire electric discharge machine, and the prediction information may be relearned and updated for the other multiwire electric discharge machine.

Furthermore, deep learning, in which extraction of a feature amount itself is learned, can be used as the learning algorithm by the model generation unit 223. Alternatively, machine learning may be performed according to another known method such as genetic programming, function logic programming, or a support vector machine.

Figure 17:
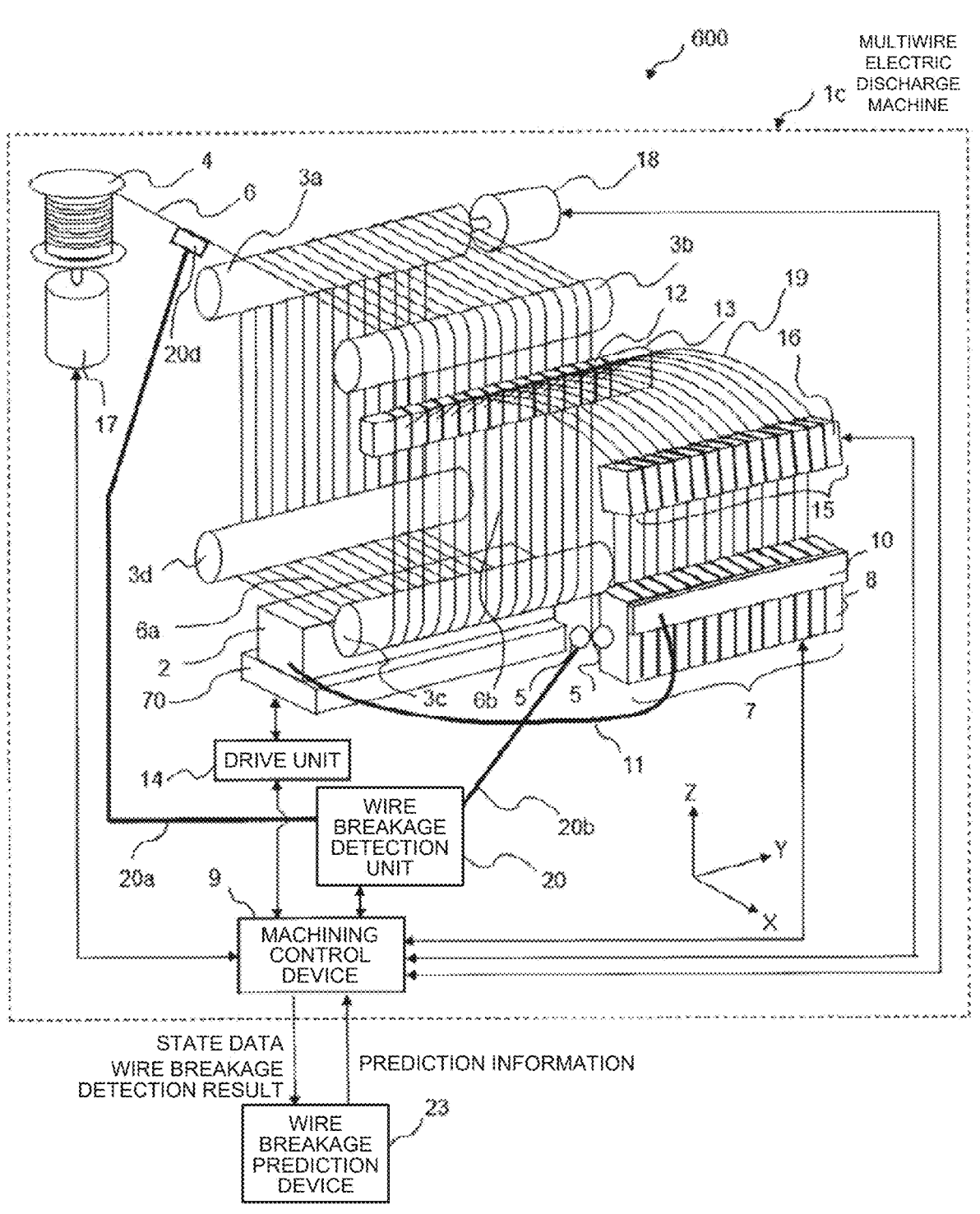
FIG. 17 is a diagram illustrating another configuration of the multiwire electric discharge machining system according to the fifth embodiment.

In the above-described example, prediction information is calculated inside the multiwire electric discharge machines 1a and 1b, but the prediction information may be generated by a wire breakage prediction device different from the multiwire electric discharge machines 1a and 1b. FIG. 17 is a diagram illustrating a configuration of a multiwire electric discharge machining system 600 including a multiwire electric discharge machine 1c and a wire breakage prediction device 23. The wire breakage prediction device 23 includes the wire breakage prediction unit 21 and the machine learning device 22 that are the same as those described above. In the learning phase, the wire breakage prediction device 23 acquires wire breakage detection results and state data from the multiwire electric discharge machine 1c as training data, and generates a learned model by performing processing similar to that described in <Learning Phase> above. In the utilization phase, the wire breakage prediction device 23 calculates prediction information by newly acquiring state data from the multiwire electric discharge machine 1c and inputting the state data to the learned model generated in the learning phase, and outputs the prediction information to the machining control device 9 of the multiwire electric discharge machine 1c. The machining control device 9 controls electric discharge machining by a method similar to that described above so as to prevent breakage of the wire electrode by using the acquired prediction information. With such a configuration of the multiwire electric discharge machining system 600, machine learning and inference processing that put a load on the system can be performed outside the multiwire electric discharge machine.

According to the fifth embodiment, it is possible to obtain the effect of preventing wire breakage by controlling machining conditions based on prediction of wire breakage in multiwire electric discharge machining. In addition, the learning phase of the machine learning device can be executed for each wire breakage. This achieves the effect of improving the accuracy of predicting wire breakage.

The configurations set forth in the above embodiments show examples of the subject matter of the present disclosure, and it is possible to combine the configurations with another known technique, and is also possible to partially omit or change the configurations without departing from the scope of the present disclosure.

REFERENCE SIGNS LIST 1, 1a, 1b, 1c multiwire electric discharge machine; 2 workpiece; 3a, 3b, 3c, 3d guide roller; 4 wire bobbin; 5 wire ejection roller; 6 wire electrode; 6a cutting wire section; 6b power-supply wire section; 7 machining power source; 8 machining power supply unit; 9 machining control device; 10 ground electrode; 11 cable; 12 power feeding element; 13 power feeding element unit; 14 drive unit; 15 machining-state detection device; 16 machining-state detection unit; 17 wire bobbin drive unit; 18 guide roller drive unit; 19 wire; 20, 30, 40, 50 wire breakage detection unit; 20a, 20b connection destination of wire breakage detection unit; 20d power feeding element for wire breakage detection; 21 wire breakage prediction unit; 22, 22b machine learning device; 23 wire breakage prediction device; 60 simulated voltage source; 70 machining stage; 91 processor; 92 memory; 93 external storage device; 94 input unit; 95 output unit; 201, 202 rectifier circuit; 201a, 202a rectifier diode; 203 smoothing circuit; 203a high-frequency cutoff inductor; 203b damper diode; 204 wire breakage detection power source; 205 current limiting resistor; 206 wire breakage detection circuit; 207, 305, 404 wire breakage determination unit; 211, 222 state observation unit; 212 inference unit; 221 data acquisition unit; 223 model generation unit; 224 learned model storage unit; 301 low-pass characteristic unit; 302, 402 wire breakage signal output unit; 303, 403 signal processing circuit; 304 binarization circuit; 304a photocoupler; 304b pull-up resistor; 401 frequency detection unit; 500, 600 multiwire electric discharge machining system.

The invention claimed is:

1. A multiwire electric discharge machine that comprises a cutting wire section including a plurality of cutting wires arranged in parallel and located in such a way as to face a workpiece, the plurality of cutting wires being stretched in parallel between a plurality of guide rollers by winding a single wire electrode around the plurality of guide rollers, and that cuts the workpiece by causing an electric discharge between the cutting wire section and the workpiece, the multiwire electric discharge machine comprising:

a machining power source to apply a machining pulse voltage between the workpiece and the cutting wire section; and a wire breakage detector to detect breakage of the wire electrode, wherein the wire breakage detector is electrically connected to a wire electrode portion of the wire electrode stretched over a section from one location on a feeding side of the wire electrode to one location on an ejection side of the wire electrode, and the wire breakage detector includes:

a wire breakage detection circuit that is an electric circuit in which a wire breakage detection power source and a current limiting resistor are connected in series, the wire breakage detection power source constantly supplying a direct current to the wire electrode portion at least while the workpiece is undergoing a cutting process; and a wire breakage determiner including a circuit, the wire breakage determiner being configured to determine breakage of the wire electrode based on a current flowing through the current limiting resistor.

2. The multiwire electric discharge machine according to claim 1, wherein the wire breakage detection circuit is an electric circuit in which a rectifier circuit and a smoothing circuit are further connected in series, the rectifier circuit rectifying a high-frequency voltage generated in the wire electrode portion according to the machining pulse voltage and a state of the electric discharge, the smoothing circuit smoothing a current rectified by the rectifier circuit.

3. The multiwire electric discharge machine according to claim 1, wherein when a state where current stops flowing through the current limiting resistor is able to be detected, the wire breakage determiner determines that the wire electrode is broken.

4. The multiwire electric discharge machine according to claim 3, wherein the wire breakage determiner includes:

a binarization circuit to convert current flowing through the current limiting resistor into a binarized signal that is a low-level signal or a high-level signal according to whether current is flowing through the current limiting resistor; and a signal processing circuit to detect, based on the binarized signal, the state where current stops flowing through the current limiting resistor, and output a wire breakage signal indicating a result of determination on breakage of the wire electrode.

5. The multiwire electric discharge machine according to claim 4, wherein the signal processing circuit outputs the wire breakage signal based on a result of comparison between a predetermined threshold value and a signal obtained by passing the binarized signal through a low-pass filter.

6. The multiwire electric discharge machine according to claim 4, wherein the signal processing circuit detects a frequency of the binarized signal, and outputs the wire breakage signal based on a result of comparison with a predetermined threshold value.

7. The multiwire electric discharge machine according to claim 1, further comprising:

wire breakage prediction circuitry to output prediction information that is information indicating a possibility of breakage of the wire electrode, wherein the wire breakage prediction circuitry is configured to:

acquire state data, the state data being information indicating a machining state; and infer the prediction information from the state data, by using a learned model generated by machine learning based on combinations of the state data and results of detection of breakage of the wire electrode.

8. The multiwire electric discharge machine according to claim 7, wherein the state data includes at least one of relative distance between the workpiece and the cutting wire section, wire traveling speed, wire tension, electrode gap voltage, the number of times an electric discharge occurs per unit time, the number of times a short circuit occurs per unit time, or the machining pulse voltage.

9. The multiwire electric discharge machine according to claim 7, further comprising:

a machine learning device to learn the prediction information, wherein the machine learning device is configured to:

acquire the state data;

acquire a result of detection of breakage of the wire electrode; and generate the learned model by machine learning according to training data created based on combinations of the state data and the results of detection of breakage of the wire electrode.

10. The multiwire electric discharge machine according to claim 7, further comprising:

a machining control device including a processor, the machining control device being configured to control electric discharge machining based on the prediction information in such a way as to prevent breakage of the wire electrode.

11. The multiwire electric discharge machine according to claim 10, wherein when the prediction information indicates that there is a possibility of breakage of the wire electrode, the machining control device controls the machining power source in such a way as to make machining energy lower than current machining energy.

12. The multiwire electric discharge machine according to claim 10, further comprising:

a guide roller driver to drive one of the plurality of guide rollers; and a wire bobbin driver to drive a wire bobbin, wherein when the prediction information indicates that there is a possibility of breakage of the wire electrode, the machining control device controls the guide roller driver and the wire bobbin driver in such a way as to make wire tension smaller than a current wire tension or make wire traveling speed greater than a current wire traveling speed.

13. A multiwire electric discharge machining system comprising:

the multiwire electric discharge machine according to claim 7; and a machine learning device to generate the learned model, wherein the machine learning device is configured to:

acquire the state data;

acquire a result of detection of breakage of the wire electrode; and generate the learned model by machine learning according to training data created based on combinations of the state data and the results of detection of breakage of the wire electrode.

14. A multiwire electric discharge machining system comprising:

the multiwire electric discharge machine according to claim 1; and a wire breakage prediction device to output prediction information that is information indicating a possibility of breakage of the wire electrode, wherein the wire breakage prediction device is configured to:

acquire state data, the state data being information indicating a machining state;

acquire a result of detection of breakage of the wire electrode;

generate a learned model by machine learning according to training data created based on combinations of the state data and the results of detection of breakage of the wire electrode; and infer the prediction information from the state data by using the learned model, the state data being input from the state observation circuitry.

15. The multiwire electric discharge machining system according to claim 14, wherein the state data includes at least one of relative distance between the workpiece and the cutting wire section, wire traveling speed, wire tension, electrode gap voltage, the number of times an electric discharge occurs per unit time, the number of times a short circuit occurs per unit time, or the machining pulse voltage.

16. A multiwire electric discharge machine that comprises a cutting wire section including a plurality of cutting wires arranged in parallel and located in such a way as to face a workpiece, the plurality of cutting wires being stretched in parallel between a plurality of guide rollers by winding a single wire electrode around the plurality of guide rollers, and that cuts the workpiece by causing an electric discharge between the cutting wire section and the workpiece, the multiwire electric discharge machine comprising:

a machining power source to apply a machining pulse voltage between the workpiece and the cutting wire section; and a wire breakage detector to detect breakage of the wire electrode, wherein the wire breakage detector is electrically connected to a wire electrode portion of the wire electrode stretched over a section from one location on a feeding side of the wire electrode to one location on an ejection side of the wire electrode, the wire breakage detector includes:

a wire breakage detection circuit that is an electric circuit in which a wire breakage detection power source and a current limiting resistor are connected in series, the wire breakage detection power source supplying a direct current to the wire electrode portion at least while the workpiece is undergoing a cutting process; and a wire breakage determiner including a circuit, the wire breakage determiner being configured to determine breakage of the wire electrode based on a current flowing through the current limiting resistor, the wire breakage determiner includes:

a binarization circuit to convert current flowing through the current limiting resistor into a binarized signal that is a low-level signal or a high-level signal according to whether current is flowing through the current limiting resistor; and a signal processing circuit to detect, based on the binarized signal, a state where current stops flowing through the current limiting resistor, and output a wire breakage signal indicating a result of determination on breakage of the wire electrode, when a state where current stops flowing through the current limiting resistor is able to be detected, the wire breakage determiner determines that the wire electrode is broken, and the signal processing circuit outputs the wire breakage signal based on a result of comparison between a predetermined threshold value and a signal obtained by passing the binarized signal through a low-pass filter.

* * * * *